Figure 1:
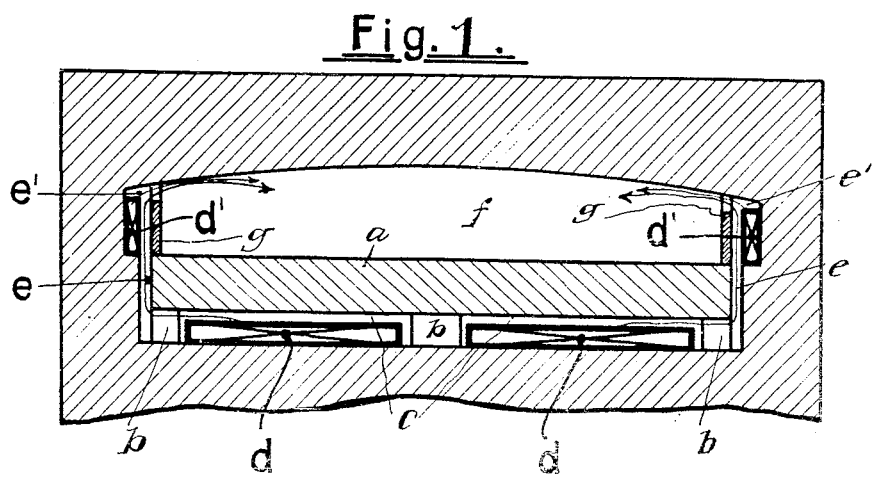

May 27, 1924.

F. GRAF 1,495,685

OVEN AND ELECTRIC HEATER THEREFOR

Filed Nov. 9, 1920  2 Sheets-Sheet 1

Inventor
F. Graf,
By H. R. Kerslake
Attorney

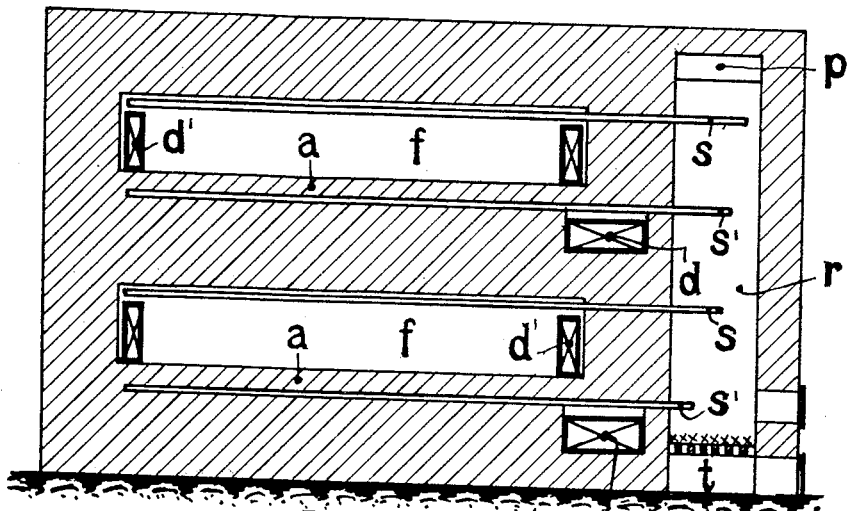
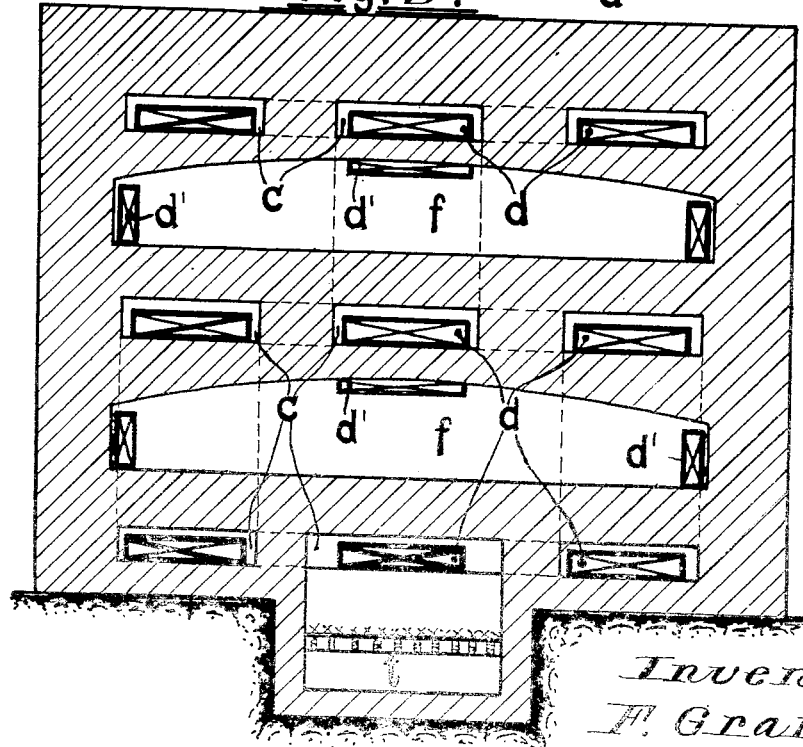

Patented May 27, 1924.

1,495,685

UNITED STATES PATENT OFFICE

FRANZ GRAF, OF BADEN, SWITZERLAND.

OVEN AND ELECTRIC HEATER THEREFOR.

Application filed November 9, 1920. Serial No. 422,844.

*To all whom it may concern:*

Be it known that I, FRANZ GRAF, a citizen of the Swiss Republic, and residing at Zurcher Strasse 65, Baden, Switzerland, have invented certain new and useful Ovens and Electric Heaters Therefor, of which the following is a specification.

This invention relates to fuel heated baking ovens and the electrification thereof.

One object of the invention is to convert existing fuel heated baking ovens into electrically heated ovens without interfering with the existing fuel heating arrangements, so that the oven can be heated by either means singly or by the combination of both means.

Another object of the invention is to make fuel heated ovens independent of the fuel employed should this become scarce or the price of same become too high, also in the case of a breakdown of the electrical energy to make the ovens independent of this by heating by means of fuel.

Another object of the invention is to save the capital cost of installing a new electrically heated oven in place of the existing fuel heated oven by adapting the latter for electrical heating.

The accompanying drawings illustrate structures in accordance with the present invention.

In the drawings,

Figure 1 is a sectional view of a fuel heated oven in which electrical heating elements are situated within the baking space and also without, Figure 2 is a sectional view of a tubular oven heated by steam pipes in which the electrical heating elements are situated within and without the baking space, and Figure 3 is a sectional view of an oven in which the electrical heating elements situated without the baking space are located in the existing flues of the furnace.

Referring to Figure 1; the oven bottom $a$ is supported on tiles $b$ so that a hollow space forming a compartment $c$ is obtained to receive electric heaters $d$. At the sides of the oven, flues or ducts $e$ are provided through which the heated air from the compartment $c$ can be passed into the oven space or chamber $f$, the tiles $b$ being so arranged or formed as to provide apertures through which the heated air can escape from the compartment $c$ to the side flue or duct $e$ and in order to cause the heated air to enter the oven space or chamber $f$ at the top guiding plates or partitions $g$ having apertures $h$ are provided.

The heating effect is further increased by the provision of additional heaters $d'$ (Figure 1) disposed in chambers $e'$ in the baking space at the sides of the flues or ducts $e$ and these heaters $d'$ are arranged to be controlled either together with the heaters $d$ or separately. In the ovens adapted to be used for several days the heaters $d$ help to create a top heat for the baking space or chamber below it.

The complete enclosure of the electric heaters in heat storing material is of great advantage by making the cheap waste power in the night available during the greater part of the day without having to use expensive day current during this period. By the provision of the side flues or ducts $e$ the heat reaches the oven space or chamber $f$ quickly so that the bottom $a$ of the oven is also heated strongly from above and can therefore, if necessary, be made of considerable thickness; by this means not only burning of the contents of the oven is prevented, but the heat storage capacity is increased by utilizing the cheap night current.

The construction of an oven described renders an even baking possible and allows the current to be left on during baking and it is equally suitable for adapting existing fuel heated ovens thereto and for newly erected ovens.

For obtaining a uniform heat and especially in ovens having inclined interiors the heating elements are so designed as to be displaceable, for instance, in the longitudinal direction of the oven.

Referring to Figures 2 and 3. In the structure according to Figure 2, the outlet $p$ for the heating gases is at the top of the furnace space $r$ and into the latter, closed steam pipes $s$ and $s'$ project in a known manner, a part of which serves for heating the bottom $a$ of the oven spaces or chambers $f$ and another part provides the top heat. Besides the electric heaters $d'$, the heat from which is distributed uniformly over the upper part of each oven space or chamber $f$ by means of the steam pipe $s$, further heaters $d$ are located, below the steam pipes $s'$, in the closed horizontal cross-flues formed in the oven structure, by means of which a uniform bottom heat is obtained in the oven spaces or chambers $f$. $t$ is the fire-grate.

The construction of oven according to Figure 3, is provided, additionally to the electric heaters $d'$ positioned in the oven spaces or chambers $f$, with a plurality of heating resistances $d$; a series of three is shown in Figure 3, which lie in the horizontal portions of the heating flues $c$ and $c'$ and serve for heating the top and bottom brickwork of the baking spaces or chambers $f$; $t$ is the fire-grate.

Ovens designed according to Figures 2 and 3 may be operated in various ways. They may be heated by fuel only, or by the electric heaters only, and in the latter case by either set of the resistance elements only, or heating by fuel and electricity conjointly. Further, by cutting in and out the heaters, by series or parallel arrangements and by series or parallel resistances, the heating current, the heating of the oven and the time taken in obtaining the required heat for baking may be regulated.

By the constructions and arrangements set forth herein a more uniform and better distribution of the heating effect is obtained and thereby the output of the oven is increased in a given time.

Having now described my invention what I claim as new and desire to secure by Letters Patent is:—

1. In fuel heated baking ovens the combination of electrical heating elements located within the baking space itself with electrical heating elements situated outside the baking space.

2. In fuel heated baking ovens using steam heating pipes the combination of electrical heating elements located within the baking space itself with electrical heating elements situated in close proximity to the steam heating pipes.

3. In fuel heated baking ovens the combination comprising steam heating pipes, flues situated at right angles to the longitudinal direction of the steam heating pipes, electrical heating elements situated within the said flues, and electrical heating elements situated within the baking space itself.

In testimony whereof I have signed my name to this specification.

FRANZ GRAF.